United States Patent
Ng (10) Patent No.: US 9,841,825 B2
(45) Date of Patent: Dec. 12, 2017

(54) KEYS DEACTIVATION SYSTEM AND METHOD

(71) Applicant: RAZER (ASIA-PACIFIC) PTE LTD, Singapore (SG)

(72) Inventor: Chern Ann Ng, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 121 days.

(21) Appl. No.: 14/823,708

(22) Filed: Aug. 11, 2015

(65) Prior Publication Data

US 2015/0346842 A1    Dec. 3, 2015

Related U.S. Application Data

(63) Continuation of application No. 12/281,283, filed as application No. PCT/SG2007/000286 on Aug. 30, 2007, now abandoned.

(51) Int. Cl.
    *G06F 3/02*    (2006.01)
    *G06F 3/023*   (2006.01)

(52) U.S. Cl.
    CPC .................. *G06F 3/0238* (2013.01)

(58) Field of Classification Search
    CPC .............. G06F 3/0238; G06F 3/023
    See application file for complete search history.

(56) References Cited

U.S. PATENT DOCUMENTS

| | | | |
|---|---|---|---|
| 6,011,544 A | 1/2000 | Sato | |
| 7,023,536 B2 | 4/2006 | Zhang et al. | |
| 7,038,846 B2 | 5/2006 | Mandella | |
| 7,088,440 B2 | 8/2006 | Buermann et al. | |

(Continued)

FOREIGN PATENT DOCUMENTS

| | | |
|---|---|---|
| DE | 3604236 C1 | 8/1987 |
| TW | 572271 U | 1/2004 |
| TW | I261777 B | 9/2006 |

OTHER PUBLICATIONS

German Patent Office, Office Action dated Nov. 20, 2014, for German Patent Application No. 112007003635.4, 18 pages.

(Continued)

*Primary Examiner* — Adam R Giesy
(74) *Attorney, Agent, or Firm* — Polsinelli PC (57) ABSTRACT

Personal computer (PC) and online gaming are gaining popularity around the world. Typically players use human interface devices (HIDs) such as keyboards and mice for playing PC games. Many of the modern PC games use a control scheme commonly known as the "WASD/Mouse" which is a combination of the "WASD" keyboard keys and the mouse as means for interacting with the PC games. Additionally, for expansion on existing game control functions, modifier keys are used in conjunction with other keyboard keys to serve as shortcut keys for activating such game control functions. However, due to close positioning of the "WINDOWS" key with the modifier keys on the keyboards, the "WINDOWS" menu might be activated accidentally during normal PC game play especially when players frequently access the shortcut keys. An embodiment of the invention describes a system and method for deactivating keys selectable on human interface devices.

36 Claims, 5 Drawing Sheets

(56) References Cited

U.S. PATENT DOCUMENTS

| | | |
|---|---|---|
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,474,809 B2 | 1/2009 | Carl et al. |
| 7,691,909 B2 | 4/2010 | Sorensen et al. |
| 7,729,515 B2 | 6/2010 | Mandella et al. |
| 7,826,641 B2 | 11/2010 | Mandella et al. |
| 8,542,219 B2 | 9/2013 | Carl et al. |
| 8,553,935 B2 | 10/2013 | Mandella et al. |
| 2004/0003663 A1 | 2/2004 | Ford |
| 2005/0168437 A1 | 8/2005 | Carl et al. |
| 2006/0012577 A1 | 1/2006 | Kyrola |
| 2006/0132447 A1* | 6/2006 | Conrad ............... G06F 3/0219 345/168 |
| 2006/0284847 A1* | 12/2006 | Pate .................... G06F 3/0238 345/168 |
| 2007/0091070 A1* | 4/2007 | C. Larsen ............ G06F 3/0213 345/168 |
| 2011/0227915 A1 | 9/2011 | Mandella et al. |
| 2012/0038549 A1 | 2/2012 | Mandella et al. |
| 2013/0194418 A1 | 8/2013 | Gonzalez-Banos et al. |

OTHER PUBLICATIONS

Kolokythas, P., Tastenbelegung je nach Bedarf wechseln, Computer & Technik—PC-WELT, Feb. 26, 2004, http://www.pcwelt.de/tipps/Tastenbelegung-je-nach-Bedarf-wechseln, 3 pages.

\* cited by examiner

| Software Application | |
|---|---|
| Key: | |
| Modify key function: | |
| Key function modification timeout: | |
| Revert to original function: | |
| Swap function of key: | |
| Shortcut for adding function to key: | |
| Initiate "change-function" profile on computer startup: | |

FIG. 5

KEYS DEACTIVATION SYSTEM AND METHOD

CROSS REFERENCE TO RELATED APPLICATIONS

This application is a continuation and claims the benefit of U.S. national phase application Ser. No. 12/281,283 having a 35 U.S.C. §371 date of Aug. 23, 2010, which claims priority to PCT application PCT/SG2007/000286 having an international filing date of Aug. 30, 2007, both of which are expressly incorporated by reference herein in their entireties.

TECHNICAL FIELD

The invention relates generally to input devices for personal computers. In particular, the invention relates to a system and method for deactivating keys selectable on human interface devices.

BACKGROUND

Gaming, whether on the ubiquitous personal computer (PC) or console platform, is fast gaining popularity worldwide. As a result, the PC and video gaming industries are posting record sales for portable and console hardware, software and accessories. Further, with the vast improvement of Internet technology, online gaming is also poised to take off as the next wave for PC gaming.

Typically, players use human interface devices (HIDs) such as keyboards and mice to interact with PC games. The genres of PC games range from First Person Shooter (FPS) games to Massive Multiplayer Online Role Player Games (MMORPGs). In order to play the PC games, the players generally use a combination of the "WASD" keys of the keyboard and the mouse as means for interacting with the PC games. Such a control scheme is commonly referred to as the "WASD/Mouse" combination. The "WASD" keys typically provide movements for game characters including forward, backward, left and right sidestepping. Additionally, the mouse is used for controlling the game characters' movement directions in which the players control the game characters for character interaction when they play the PC games. Furthermore, modifier keys such as "CONTROL" (CTRL), "ALT" and "SHIFT" are used in conjunction with other keyboard keys to serve as shortcut keys for most PC games. The shortcut keys are used to activate other game play functions during game play.

In the midst of playing a game, a player may unintentionally activate a button that disrupts the game. For example, the player may unintentionally press the "WINDOWS" key on keyboards when attempting to access the shortcut keys since the "WINDOWS" key is typically located on the keyboard together with the modifier keys. The "WINDOWS" menu is then activated and the game will be abruptly interrupted for a short period before the player resumes game play by manually deactivating the "WINDOWS" menu. Such unintentional activation of the "WINDOWS" menu will thus bring about decreased satisfaction in the overall gaming experience for many players.

Hence, there affirms a need for a system and method that address the foregoing problems of using human interface devices for playing PC games.

SUMMARY

Embodiments of the invention disclosed herein provide a system and method for deactivating keyboard keys.

In accordance with a first aspect of the invention, there is disclosed a system comprising a plurality of keys and an input. The plurality of keys is operable for communicating with a computing device, each of the plurality of keys having a function associated therewith, the function associated with each of the plurality of keys being executable by the computing device. The input means is operable for activating a deactivation state, at least one of the plurality of keys being operable during the deactivation state for deactivating the at least one of the plurality of keys. Operating at least one of the deactivated at least one of the plurality of keys impedes execution of the function associated therewith.

In accordance with a second aspect of the invention, there is disclosed an apparatus comprising an input means. The input means is operable for activating a deactivation state, at least one of a plurality of keys being operable during the deactivation state for deactivating the at least one of the plurality of keys, the plurality of keys being operable for communicating with a computing device, each of the plurality of keys having a function associated therewith, the function associated with each of the plurality of keys being executable by the computing device. Operating at least one of the deactivated at least one of the plurality of keys impedes execution of the function associated therewith.

In accordance with a third aspect of the invention, there is disclosed a computer implemented method comprising providing a plurality of functions being executable by a computing device, each of the plurality of keys being associated with one of a plurality of functions and being operable for communicating with the computing device, the function associated with each of the plurality of keys being executable by the computing device. Additionally, the computer implemented method comprises detecting activation of a deactivation state. Lastly the computer implemented method comprises deactivating at least one of the plurality of keys, the at least one of the plurality of keys being operated during the deactivation state. Operating at least one of the deactivated at least one of the plurality of keys impedes execution of the function associated therewith.

In accordance with a fourth aspect of the invention, there is disclosed a machine readable medium having stored therein a plurality of programming instructions, which when executed, the instructions cause the machine to provide a plurality of functions being executable by a computing device, each of the plurality of keys being associated with one of a plurality of functions and being operable for communicating with the computing device, the function associated with each of the plurality of keys being executable by the computing device. Further, the instructions cause the machine to detect activation of a deactivation state. Lastly, the instructions cause the machine to deactivate at least one of the plurality of keys, the at least one of the plurality of keys being operated during the deactivation state. Operating at least one of the deactivated at least one of the plurality of keys impedes execution of the function associated therewith.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Embodiments of the invention are disclosed hereinafter with reference to the drawings, in which.

DESCRIPTION

A system and method for deactivating keys selectable on human interface devices are described hereinafter for addressing the foregoing problems.

For purposes of brevity and clarity, the descriptions of embodiments of the invention are limited hereinafter to applications related to deactivation of keys selectable on human interface devices. This however does not preclude various embodiments of the invention from other applications that require similar operating performance. The fundamental operational and functional principles of the embodiments of the invention are common throughout the various embodiments.

Exemplary embodiments of the invention described hereinafter are in accordance with FIGS. 1 to 5 of the drawings, in which like elements are numbered with like reference numerals.

Figure 1:
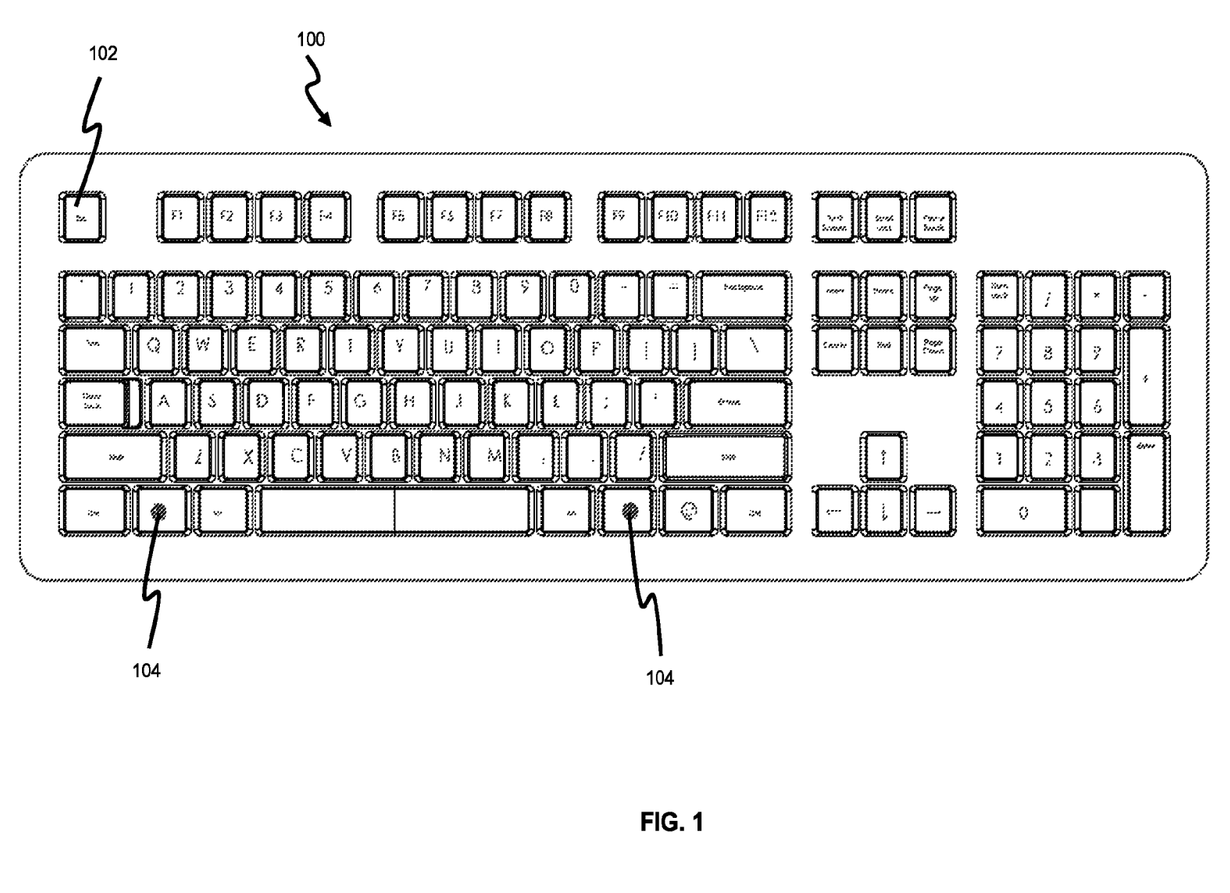
FIG. 1 shows a keyboard with a deactivation key used in conjunction with any keys of the keyboard for deactivating the keys according to a first embodiment of the invention.

A first embodiment of the invention, a system for deactivating keys selectable on a human interface device (HID) such as a keyboard 100 is shown in FIG. 1. In the first embodiment, the system comprises a deactivation key 102 formed on the keyboard 100. Alternatively, the deactivation key 102 is providable on a separate peripheral device, which uses a communication interface well known in the art for coupling to and communicating with a computer system (not shown) via keyboards or other HIDs coupled to the computer system. The communication interface is preferably one of a PS/2, Universal-Serial-Bus (USB), Bluetooth, Infrared (IR), Radio-Frequency (RF) or Wireless USB.

With reference to the first embodiment, the deactivation key 102 is used in conjunction with a key 104 on the keyboard 100 for disabling the key 104. The keyboard 100 is preferably a wired keyboard coupled for communicating with the computer system via a communication interface (all not shown). The communication interface is one of a PS/2 or Universal-Serial-Bus (USB). Alternatively, the keyboard 100 is a wireless keyboard in wireless signal communication with the computer system via a communication interface (not shown), for example one of a Bluetooth, Infrared (IR), Radio-Frequency (RF) or Wireless USB. In addition, the keyboard 100 is preferably an IBM-compatible keyboard with a QWERTY keyboard layout design.

In one instance, the keys on the keyboard 100 need to be defined in a configuration state prior to being deactivated. A user (not shown) preferably uses a configuration button (not shown) provided on one of the keyboard 100 and a separate peripheral device for activating the configuration state. For example, the user presses the configuration button simultaneously with any selected keys on the keyboard 100 for defining a keys-group (not shown), which comprises one or more keys the user wishes to deactivate subsequently using the deactivation key 102. The keys-group is then stored in a user profile on the computer system or no the keyboard 100. Alternatively, the user can define the keys-group by first actuating and releasing the configuration button. The user then selects a plurality of keys on the keyboard 100 for defining the keys-group without need for simultaneous actuating of the configuration button. When the user has finished defining the keys-group, the user then actuates the configuration button again or a specially defined key such as the "ESC" key to store the keys-group into the user profile. To re-define a new keys-group, the user repeats the aforementioned sequence steps. Alternatively, the user may activate a software application (not shown) on the computer system, which allows the user to re-define a new keys-group by accessing the user profile using the software application.

Figure 2:
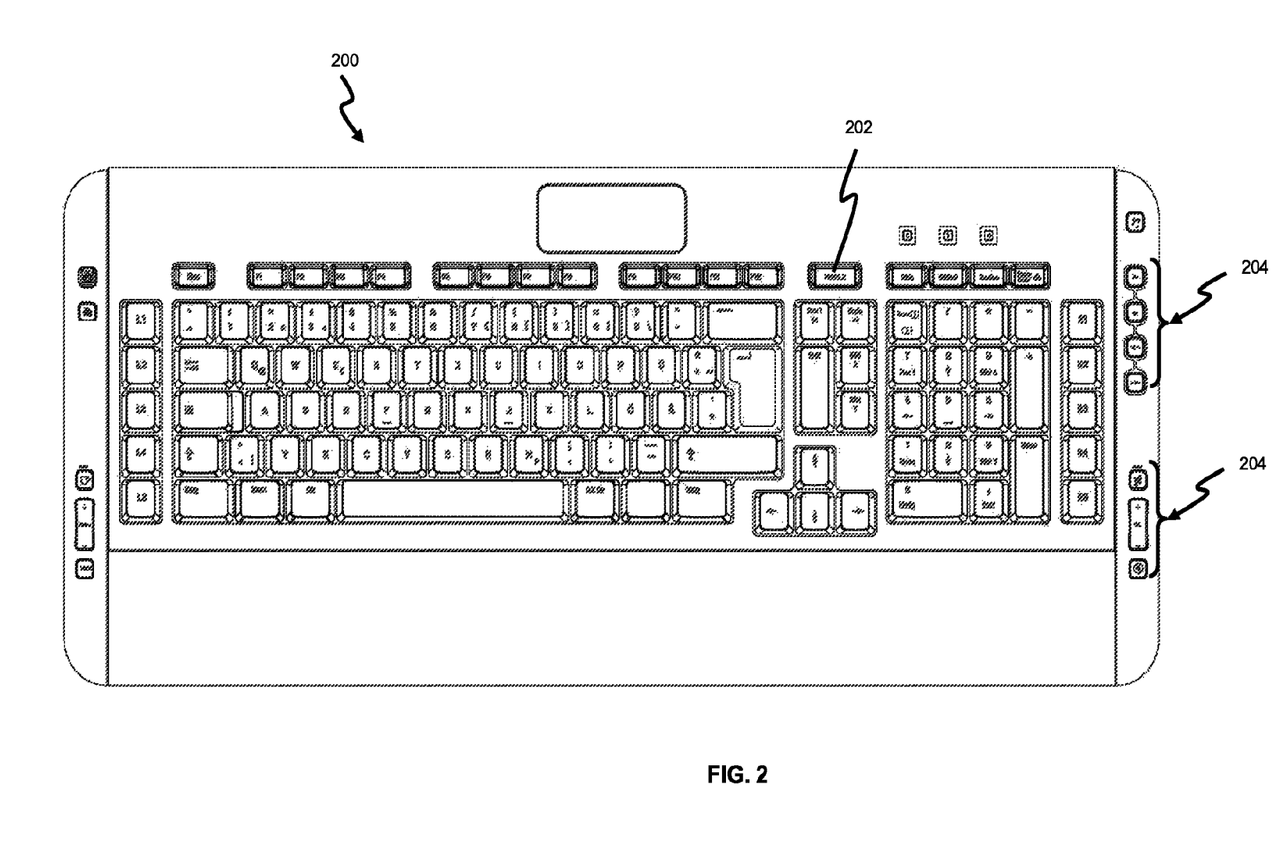
FIG. 2 shows an enhanced keyboard of FIG. 1 with a deactivation key used in conjunction with any keys of the enhanced keyboard for deactivating the keys.

In the first embodiment shown in FIG. 1, the deactivation key 102 is preferably any key provided on the keyboard 100 such as the "ESC" key. Alternatively, the deactivation key 102 is a special key such as the deactivation key 202 additionally formed on a keyboard 200 as shown in FIG. 2. The keyboard 200 is similar to the keyboard of 100 but enhanced with multimedia function buttons 204 such as volume buttons, a play button, a fast-forward button and a reverse button. When the user wishes to deactivate the key 104 such as the "WINDOWS" key in certain situations for example during PC gaming, the user simply actuates a combination of the "ESC" key together with the "WINDOWS" key in order to temporarily deactivate the function of the "WINDOWS" key. The user is then able to continue using the keyboard 100 for PC gaming without accidentally triggering the activation of the "WINDOWS" menu during PC gaming. The function of the "WINDOWS" key is restorable by actuating the combination of the "ESC" key together with the "WINDOWS" key again. Further, a combination of other keys on the keyboard 100 may also be defined as shortcut keys for restoring the function of the "WINDOWS" key.

Alternatively, by actuating and releasing the deactivation key 102, the key 104 is deactivatable. To restore the function of the deactivated key 104, the deactivation key 102 is actuated again. Hence, pressing the deactivation key 102 switches repeatedly between deactivation and activation of the key 104.

Yet alternatively, the keyboard 100 comprises an onboard controller (not shown) for deactivating the key 104. The controller is programmable to thereby enable selective transmissions of electrical signals sent by the keyboard 100 to the computer system when keyboard keys are actuated. Hence, when the deactivation key 102 is actuated for deactivating the key 104, the controller prevents electrical signals corresponding to actuation of the key 104 from being transmitted to the computer system. To restore the function of the key 104, the deactivation key 102 is actuated again which switches off the controller thereby re-activating the key 104.

However, yet again alternatively, a set of previously undefined keys for deactivation can be deactivated by actuating the deactivation key 102 simultaneously with keys on the keyboard 100 for selecting the keys the user wishes to deactivate subsequently using the deactivation key 102. When the user has selected the keys to be deactivated, the user then releases the actuation of the deactivation key 102 together with the plurality of keys. The user then actuates the deactivation key 102 again, which deactivates the functions of the plurality of keys. To restore the functions of the plurality of keys, a specially defined key such as the "ESC" key needs to be actuated.

Figure 3:
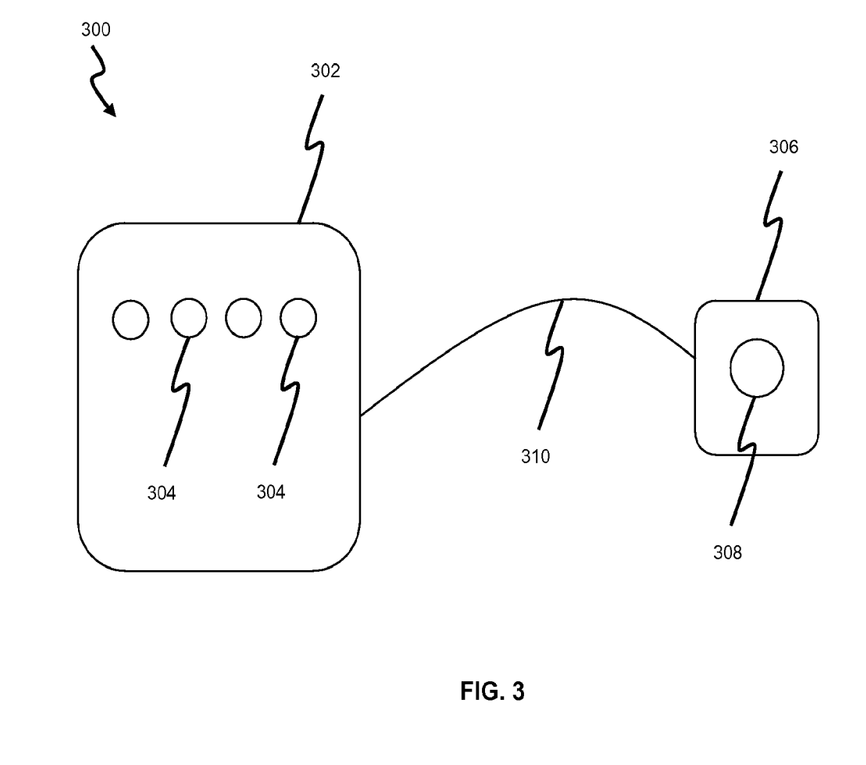
FIG. 3 shows a peripheral device with a deactivation key used in conjunction with a gamepad according to a second embodiment of the invention.

A second embodiment of the invention, a system for deactivating keys selectable on a HID such as a gamepad 302 is shown in FIG. 3. The gamepad 302 comprises buttons 304 used for gaming purposes. Additionally, the system comprises a separate peripheral device 306 containing a deactivation button 308. The deactivation button 308 is used in conjunction with any buttons 304 on the gamepad 302 for disabling at least one of the buttons 304. The peripheral device 306 couples and communicates with the gamepad 302 via a communication interface 310. The communication interface 310 is preferably one of a PS/2, Universal-Serial-Bus (USB), Bluetooth, Infrared (IR), Radio-Frequency (RF) or Wireless USB. When the user wishes to deactivate the button 304, the user simply actuates a combination of the deactivation button 308 with the button 304 to temporarily deactivate the function of the button 304. The function of the button 304 is restorable by re-actuating the combination of the deactivation button 308 together with the button 304.

Figure 4:
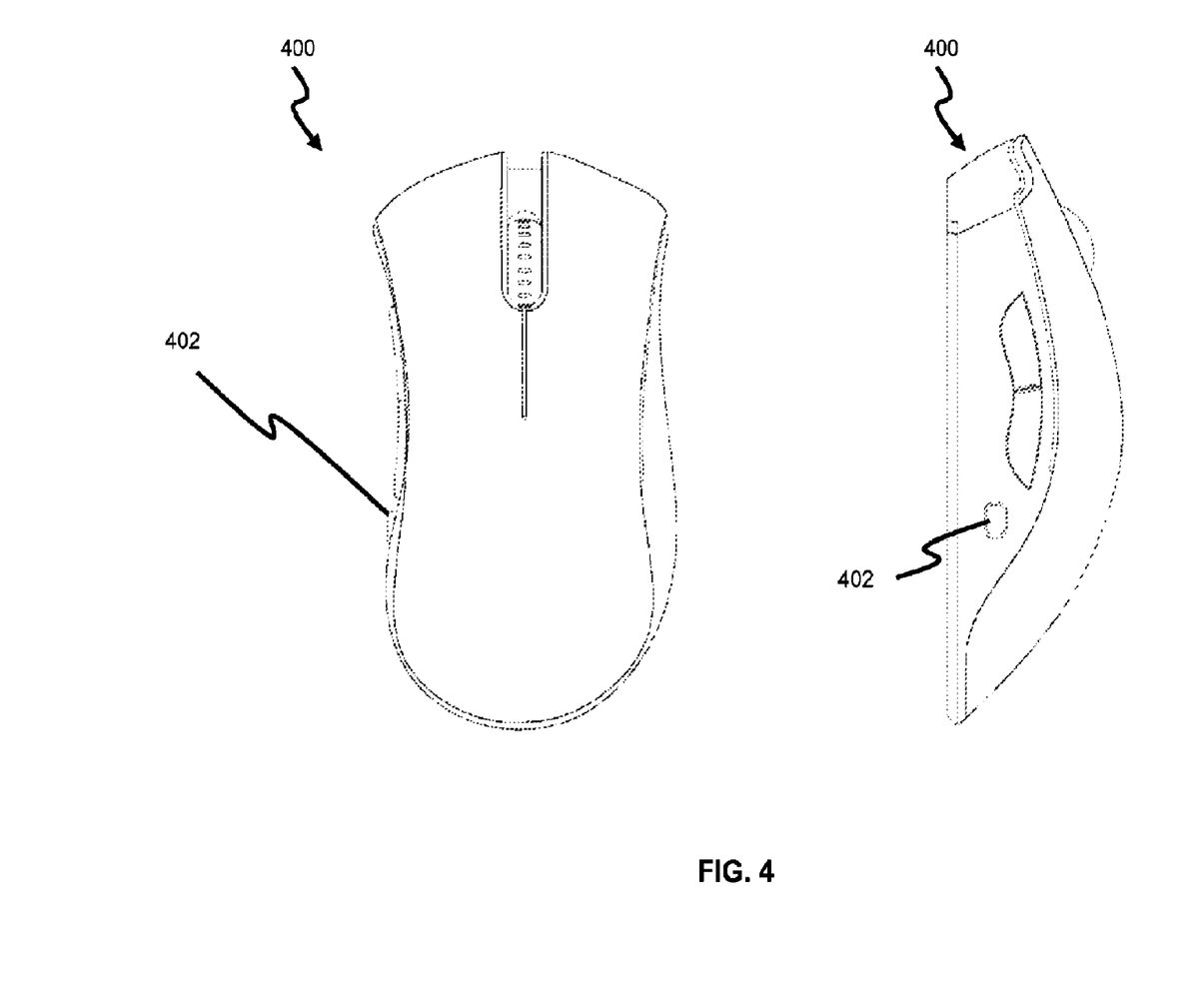
FIG. 4 shows a mouse with a deactivation key used in conjunction with any keys of the keyboard of FIG. 1 for deactivating the key according to a third embodiment of the invention.

A third embodiment of the invention, a system for deactivating keys on a HID is shown in FIG. 3. As shown in FIG. 3, a mouse 400 has deactivation key 402 formed thereon. The deactivation key 402 is used in conjunction with any key 104 for disabling the key 104. Alternatively, the deactivation key 402 is formed on one of a trackball, touchpad, digitizing pen, gamepad, graphics tablet, headphones and joystick (all not shown). The mouse 400 is preferably a wired mouse coupled for communicating with the computer system via a communication interface being one of a PS/2 or Universal-Serial-Bus (USB). Alternatively, the mouse 400 is a wireless mouse in wireless signal communication with the computer system via a communication interface being one of a Bluetooth, Infrared (IR), Radio-Frequency (RF) or Wireless USB. In order for the user to deactivate the key 104, a combination of the deactivation key 402 together with the keyboard key 104 is actuated. The function of the key 104 is then temporarily deactivated. To restore the function of the key 104, the deactivation key 402 is re-actuated together with the key 104. Alternatively, a combination of other keys may be defined as shortcut keys for restoring the function of the key 104.

Further alternatively, a group of keys, for example, on a keypad (not shown) is definable prior to being deactivatable using the deactivation key 402 on the mouse 400. The mouse 400 comprises memory means (not shown) for storing the group of keys being defined.

The group of keys is retrievable from the memory means for deactivation thereof when the deactivation key 402 is reactivated.

A fourth embodiment (not shown) of the invention comprises a sound transducer for transducing speech sound commands into data signals for transmission to the computer system thereby deactivating keys of HIDs such as the keyboard 100. The sound transducer is preferably one of a microphone and speaker headset (all not shown). The data signals are preferably pre-programmed and pre-associated with a plurality of instructions provided by an Operating System (OS) installed on the computer system. The OS is preferably one of Microsoft Windows, LINUX, UNIX and Mac OSX. The plurality of instructions comprise at least one of an activate-key instruction and deactivate-key instruction.

Before the keys of the keyboard 100 can be deactivated via user issued speech sound commands, the user has to pre-define a plurality of keys for deactivation when the speech sound commands are received by the computer system. The plurality of keys for deactivation is definable using one of the methods in the aforementioned key-configuration phase, which allows the storage of the keys-configuration into the user profile. Hence, when the computer system receives and interprets speech sound commands corresponding to the plurality of instructions, the computer system then deactivates the plurality of keys as defined in the user profile accordingly. To re-activate the plurality of keys, the user issues another set of speech sound commands in which the computer system then activates the plurality of keys accordingly.

Figure 5:
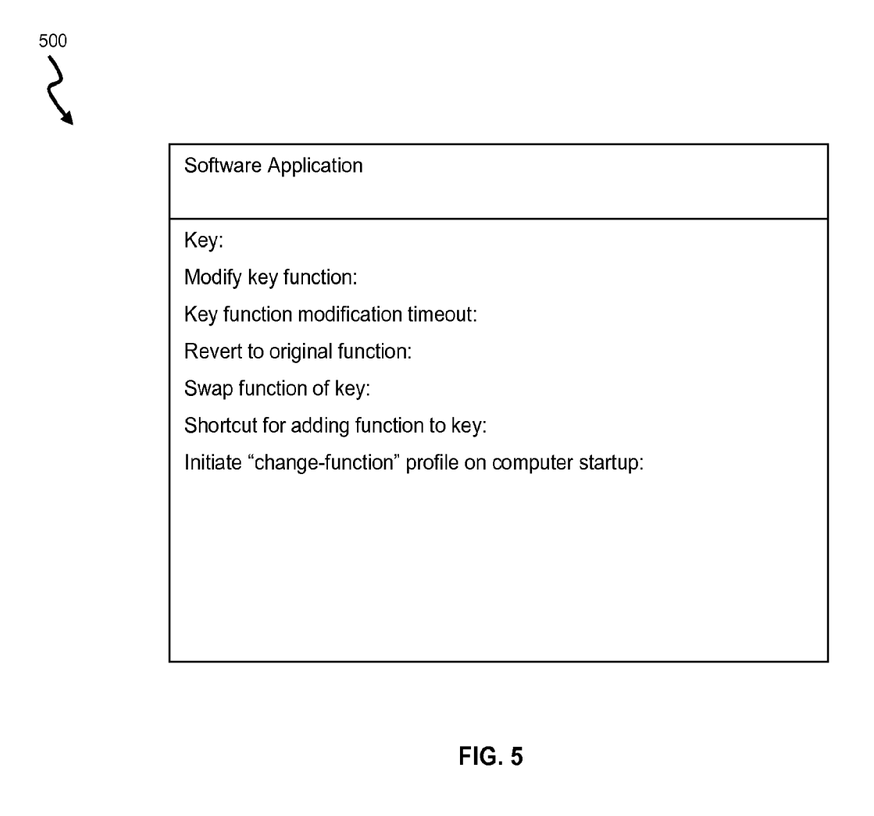
FIG. 5 shows a graphical format of a software application used in conjunction with the mouse of FIG. 3 and any keys of the keyboard of FIG. 1 for switching functions of the keys.

FIG. 5 lists functions 500 of a software application that is activated upon pressing the deactivation key 402 located on the mouse 400. The software application is also preferably activatable by one of the deactivation key 102 and deactivation key 202. The functions 500 comprise options that allow the user to have more control over the disabling or changing the function of the key 104. The options are respectively: a key, a modify-key-function, a key-function-modification-timeout, a revert-to-original-function, a swap-function-of-key, a shortcut-for-adding-function-to-key and an initiate-"change-function"-profile-on-computer-startup. The key option specifies the key 104. The modify-key-function option then allows the user to define a new function assignable to the key 104.

Additionally, the key-function-modification-timeout defines a timeout period in which the new function assigned to the key 104 under the modify-key-function option will be active.

The revert-to-original-function, which accepts a Yes or No value, defines whether if the key 104 reverts back to a factory-assigned function after being assigned the new function by the user. The swap-function-of-key option allows the user to specify whether the function of the key 104 is to be swapped with another key of the keyboard 100. For example, the user may use the swap-function-of-key option to swap existing functions of the "WINDOWS" key with the "Tab" key. Further, the shortcut-for-adding-function-to-key option enables the user to use a pre-defined shortcut key under the software application 400 for assigning a new function to the key 104 instead of using the modify-key-function option. Convenience is thus provided for a user who frequently needs to change function to the key 104 without having to always use the software application 400 for this purpose. Lastly, the initiate-"change-function"-profile-on-computer-startup option allows the user to decide whether if the key 104 is assigned the new function defined under the modify-key-function option upon system startup. This is achievable by loading a key-profile corresponding to the value defined in the modify-key-function option into computer memory when the computer system starts.

In the foregoing manner, a system and method for deactivating keys selectable on human interface devices are described according to embodiments of the invention for addressing the foregoing disadvantages. Although more than one embodiment of the invention are disclosed, it will be apparent to one skilled in the art in view of this disclosure that numerous changes and/or modification can be made without departing from the scope and spirit of the invention.

The following examples pertain to further embodiments.

Example 1 is a system comprising: a plurality of keys operable for communicating with a computing device, each of the plurality of keys having a function associated therewith, the function associated with each of the plurality of keys being executable by the computing device; and an input means being operable for activating a deactivation state, at least one of the plurality of keys being operable during the deactivation state for deactivating the at least one of the plurality of keys, wherein operating at least one of the deactivated at least one of the plurality of keys impedes execution of the function associated therewith.

In example 2, the subject matter of example 1 can optionally include that the at least one of the plurality of keys is deactivated by one of deactivating the function associated with each thereof and disabling communication between the at least one of the plurality of keys and the computing device.

In example 3, the subject matter of example 1 can optionally include that the input means is further being operable for deactivating the deactivation state, wherein the deactivated at least one of the plurality of keys remains deactivated subsequent the deactivation of the deactivation state.

In example 4, the subject matter of example 1 can optionally include that the input means is further being operable for reactivating the deactivated at least one of the plurality of keys.

In example 5, the subject matter of example 1 can optionally include a release key being operable for reactivating the deactivated at least one of the plurality of keys.

In example 6, the subject matter of example 1 can optionally include that the input means comprises: a sound transducer for transducing speech sounds into data signals for transmission to the computing device, the data signals associated with at least one of a plurality of instructions, the plurality of instructions comprising an activate the deactivation state instruction and a deactivate the deactivation state instruction.

In example 7, the subject matter of example 1 can optionally include that the input means is one of a switch, a toggle and a button.

In example 8, the subject matter of example 1 can optionally include that the plurality of keys are keys of one of a keyboard and a peripheral device.

In example 9, the subject matter of example 8 can optionally include that the input means is a peripheral in signal communication with one of the keyboard and the computing device.

In example 10, the subject matter of example 1 can optionally include a controller, the plurality of keys being coupled to the controller, the controller for communicatively intercoupling the plurality of keys with the computing device, wherein the controller is for disabling communication between the at least one of the plurality of keys and the computing device for deactivating the at least one of the plurality of keys.

Example 11 is an apparatus comprising: an input means being operable for activating a deactivation state, at least one of a plurality of keys being operable during the deactivation state for deactivating the at least one of the plurality of keys, the plurality of keys being operable for communicating with a computing device, each of the plurality of keys having a function associated therewith, the function associated with each of the plurality of keys being executable by the computing device; and wherein operating at least one of the deactivated at least one of the plurality of keys impedes execution of the function associated therewith.

In example 12, the subject matter of example 11 can optionally include that the at least one of the plurality of keys is deactivated by one of deactivating the function associated with each thereof and disabling communication between the at least one of the plurality of keys and the computing device.

In example 13, the subject matter of example 11 can optionally include that the input means is further being operable for deactivating the deactivation state, wherein the deactivated at least one of the plurality of keys remains deactivated subsequent the deactivation of the deactivation state.

In example 14, the subject matter of example 11 can optionally include that the input means is further being operable for reactivating the deactivated at least one of the plurality of keys.

In example 15, the subject matter of example 11 can optionally include a release key being operable for reactivating the deactivated at least one of the plurality of keys.

In example 16, the subject matter of example 11 can optionally include that the input means comprises: a sound transducer for transducing speech sounds into data signals for transmission to the computing device, the data signals associated with at least one of a plurality of instructions, the plurality of instructions comprising an activate the deactivation state instruction and a deactivate the deactivation state instruction.

In example 17, the subject matter of example 11 can optionally include that the input means is one of a switch, a toggle and a button.

In example 18, the subject matter of example 11 can optionally include that the plurality of keys are keys of one of a keyboard and a peripheral device.

In example 19, the subject matter of example 18 can optionally include that the input means is in signal communication with one of the keyboard and the computing device.

In example 20, the subject matter of example 11 can optionally include a controller, the plurality of keys being coupled to the controller, the controller for communicatively intercoupling the plurality of keys with the computing device, wherein the controller is for disabling communication between the at least one of the plurality of keys and the computing device for deactivating the at least one of the plurality of keys.

Example 21 is a computer implemented method comprising: providing a plurality of functions being executable by a computing device, each of the plurality of keys being associated with one of a plurality of functions and being operable for communicating with the computing device, the function associated with each of the plurality of keys being executable by the computing device; detecting activation of a deactivation state; and deactivating at least one of the plurality of keys, the at least one of the plurality of keys being operated during the deactivation state, wherein operating at least one of the deactivated at least one of the plurality of keys impedes execution of the function associated therewith.

In example 22, the subject matter of example 21 can optionally include that deactivating at least one of the plurality of keys comprises one of: deactivating the function associated with each of the at least one of the plurality of keys; and disabling communication between the at least one of the plurality of keys and the computing device.

In example 23, the subject matter of example 21 can optionally include detecting deactivation of the deactivation state, wherein the deactivated at least one of the plurality of keys remains deactivated subsequent the deactivation of the deactivation state.

In example 24, the subject matter of example 21 can optionally include detecting reactivation of the deactivated at least one of the plurality of keys.

In example 25, the subject matter of example 21 can optionally include providing an input means operable for at least one of activating and deactivating the deactivation state.

In example 26, the subject matter of example 25 can optionally include that providing an input means comprises: providing one of a switch, a toggle and a button.

In example 27, the subject matter of example 21 can optionally include providing a release key being operable for reactivating the deactivated at least one of the plurality of keys.

In example 28, the subject matter of example 21 can optionally include that the plurality of keys are keys of one of a keyboard and a peripheral device.

In example 29, the subject matter of example 28 can optionally include that providing an input means comprises: providing a peripheral in signal communication with one of the keyboard and the computing device.

In example 30, the subject matter of example 21 can optionally include providing a controller, the plurality of keys being coupled to the controller, the controller for communicatively intercoupling the plurality of keys with the computing device, wherein the controller is for disabling communication between the at least one of the plurality of keys and the computing device for deactivating the at least one of the plurality of keys.

Example 31 is a machine readable medium having stored therein a plurality of programming instructions, which when executed, the instructions cause the machine to: provide a plurality of functions being executable by a computing device, each of the plurality of keys being associated with one of a plurality of functions and being operable for communicating with the computing device, the function associated with each of the plurality of keys being executable by the computing device; and detect activation of a deactivation state; and deactivate at least one of the plurality of keys, the at least one of the plurality of keys being operated during the deactivation state, wherein operating at least one of the deactivated at least one of the plurality of keys impedes execution of the function associated therewith.

In example 32, the subject matter of example 31 can optionally include that the plurality of programming instructions, which when executed, the instructions cause the machine to: deactivate the function associated with each of the at least one of the plurality of keys; and disable communication between the at least one of the plurality of keys and the computing device.

In example 33, the subject matter of example 31 can optionally include that the plurality of programming instructions, which when executed, the instructions cause the machine to: detect deactivation of the deactivation state, wherein the deactivated at least one of the plurality of keys remains deactivated subsequent the deactivation of the deactivation state.

In example 34, the subject matter of example 31 can optionally include that the plurality of programming instructions, which when executed, the instructions cause the machine to: detect reactivation of the deactivated at least one of the plurality of keys.

In example 35, the subject matter of example 31 can optionally include that an input means is provided and operable for at least one of activating and deactivating the deactivation state.

In example 36, the subject matter of example 35 can optionally include that the input means is one of a switch, a toggle and a button.

In example 37, the subject matter of example 31 can optionally include that a release key is provided and operable for reactivating the deactivated at least one of the plurality of keys.

In example 38, the subject matter of example 31 can optionally include that the plurality of keys are keys of one of a keyboard and a peripheral device.

In example 39, the subject matter of example 38 can optionally include that the input means comprises a peripheral in signal communication with one of the keyboard and the computing device.

In example 40, the subject matter of example 31 can optionally include that the plurality of keys are coupled to the controller, the controller for communicatively intercoupling the plurality of keys with the computing device, wherein the controller is for disabling communication between the at least one of the plurality of keys and the computing device for deactivating the at least one of the plurality of keys.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system for controlling keys of human interface devices communicable with a computing device, the system comprising:
   a first human interface device comprising a plurality of keys for communicating with a computing device, each of the plurality of keys having a function associated therewith, the function associated with each of the plurality of keys executable by the computing device;
   wherein the plurality of keys are a set of undefined keys for deactivation;
   a controller configured to communicatively intercouple the plurality of keys with the computing device, wherein the controller is configured to disable any key of the plurality of keys by preventing electrical signals corresponding to actuation of the key from being transmitted to the computing device;
   a deactivation key;
   wherein the deactivation key is configured to define at least one key of the set of undefined keys for deactivation upon actuating the deactivation key a first time simultaneously with the at least one key of the set of undefined keys and thereafter releasing the deactivation key and the at least one key of the set of undefined keys;

wherein actuating the deactivation key a second time disables the at least one key of the set of undefined keys that has been defined;

an input means operable for activating a software application;

wherein the software application provides options for a user to control the disabling or changing of the function of a user-defined key from the plurality of keys, the options comprising:

an option to allow the user to define a new function assignable to the user-defined key; and an option to load a key-profile corresponding to the defined new function into a memory of the computing device upon system startup.

2. The system as in claim 1, wherein the user-defined key is placed in a deactivation state by actuating the input means, or the user-defined key in the deactivation state is restorable for execution of the function associated therewith by re-actuating the input means.

3. The system as in claim 2, wherein the deactivation state of the user-defined key comprises one of deactivating the function associated with the user-defined key, and disabling communication between the user-defined key and the computing device.

4. The system as in claim 1, further comprising:
a second human interface device integrated with the input means.

5. The system as in claim 1, the input means comprising:
a sound transducer for transducing speech sounds into data signals for transmission to the computing device, the data signals associated with at least one of a plurality of instructions, the plurality of instructions comprising a deactivate into a deactivation state instruction and a reactivate into an activation state instruction.

6. The system as in claim 1, the input means being one of a switch, a toggle and a button.

7. The system as in claim 1, wherein the first human interface device is a keyboard.

8. The system as in claim 1,
wherein the controller is for disabling communication between the user-defined key in a deactivation state and the computing device.

9. The system as in claim 1, further comprising:
a user profile on the computing device or the first human interface device to store data related to the user-defined key to be placed into a deactivation state.

10. The system as in claim 1, wherein the options provided by the software application comprises at least one of:
an option to specify the user-defined key to be placed into a deactivation state, or the user-defined key the function of which is to be changed;
an option to specify whether the function of the user-defined key is to be swapped with another key of the plurality of keys;
an option to define a new function assignable to the user-defined key;
an option to define a timeout period in which the new function assigned to the user-defined key will be active;
an option to define whether the user-defined key reverts back to the function initially associated with the user-defined key after being assigned the new function;
an option to enable the user to use a pre-defined shortcut key under the software application for assigning a new function to the user-defined key; or an option to allow the user to decide whether the user-defined key is assigned the new function upon system startup.

11. An apparatus having a plurality of keys each having a function associated and executable by a computing device, the apparatus comprising:

a controller configured to communicatively intercouple the plurality of keys with the computing device, wherein the controller is configured to disable any key of the plurality of keys by preventing electrical signals corresponding to actuation of the key from being transmitted to the computing device;

wherein the plurality of keys are a set of undefined keys for deactivation;

a deactivation key;

wherein the deactivation key is configured to define at least one key of the set of undefined keys for deactivation upon actuating the deactivation key a first time simultaneously with the at least one key of the set of undefined keys and thereafter releasing the deactivation key and the at least one key of the set of undefined keys;

wherein actuating the deactivation key a second time disables the at least one key of the set of undefined keys that has been defined;

an input means operable for activating a software application, wherein the software application provides options for a user to control the disabling or changing of the function of a user-defined key from the plurality of keys, the options comprising:

an option to allow the user to define a new function assignable to the user-defined key; and an option to load a key-profile corresponding to the defined new function into a memory of the computing device upon system startup.

12. The apparatus as in claim 11, wherein the user-defined key is placed in a deactivation state by actuating the input means, or the user-defined key in the deactivation state is restorable for execution of the function associated therewith by re-actuating the input means.

13. The apparatus as in claim 12, further comprising:
a release key operable for restoring the function associated with the user-defined key in the deactivation state.

14. The apparatus as in claim 11, the input means comprising:
a sound transducer for transducing speech sounds into data signals for transmission to the computing device, the data signals associated with at least one of a plurality of instructions, the plurality of instructions comprising a deactivate into a deactivation state instruction and a reactivate into an activation state instruction.

15. The apparatus as in claim 11, the input means being one of a switch, a toggle and a button.

16. The apparatus as in claim 11,
wherein the controller is for disabling communication between the user-defined key in a deactivation state and the computing device.

17. The apparatus as in claim 11, further comprising:
a user profile on the apparatus or the computing device to store data related to the user-defined key to be placed into a deactivation state.

18. A computer implemented method for controlling a plurality of keys on a first human interface device, each of the plurality of keys associated with a function executable by a computing device, the method comprising:

communicatively intercoupling the plurality of keys with the computing device using a controller;
wherein the plurality of keys are a set of undefined keys for deactivation;
actuating a deactivation key a first time simultaneously with at least one key of the set of undefined keys and thereafter releasing the deactivation key and the at least one key of the set of undefined keys in order to define the at least one key of the set of undefined keys for deactivation;
actuating the deactivation key a second time to disable the at least one key of the set of keys that has been defined;
disabling any key of the plurality of keys by preventing electrical signals corresponding to actuation of the key from being transmitted to the computing device, using the controller;
activating a software application through an input means,
providing options by the software application for a user to control the disabling or changing of the function of a user-defined key from the plurality of keys, the options comprising:
an option to allow the user to define a new function assignable to the user-defined key;
an option to load a key-profile corresponding to the defined new function into a memory of the computing device upon system startup.

19. The method as in claim 18, further comprising:
placing the user-defined key in a deactivation state when the input means is actuated, or restoring the user-defined key in the deactivation state for execution of the function associated therewith when the input means is re-actuated again.

20. The method as in claim 19, further comprising:
restoring the function associated with the user-defined key in the deactivation state when a release key is operated.

21. The method as in claim 18, wherein the input means is integrated into a second human interface device.

22. The method as in claim 18, wherein the input means comprises one of a switch, a toggle and a button.

23. The method as in claim 18, wherein the first human interface device is a keyboard.

24. The method as in claim 18, further comprising:
disabling communication between the user-defined key in a deactivation state and the computing device by the controller.

25. The method as in claim 18 further comprising:
a user profile on the computing device or the first human interface device to store data related to the user-defined key to be placed into a deactivation state.

26. A non-transitory computing device readable medium having stored therein a plurality of programming instructions, which when executed, the instructions cause a computing device to:
provide options for a user to control the disabling or changing of a function of a user-defined key on a first human interface device,
communicatively intercoupleing the computing device with a plurality of keys using a controller;
wherein the plurality of keys are a set of undefined keys for deactivation;
define at least one key of the set of undefined keys for deactivation upon actuating a deactivation key a first time simultaneously with the at least one key of the set of undefined keys and thereafter releasing the deactivation key and the at least one key of the set of undefined keys;
disable the at least one key of the set of undefined keys that has been defined upon actuating the deactivation key a second time;
disabling any key of the plurality of keys by preventing electrical signals corresponding to actuation of the key from being received at the computing device, using the controller;
wherein the options comprise:
an option to allow the user to define a new function assignable to the user-defined key;
an option to load a key-profile corresponding to the defined new function into a memory of the computing device upon system startup.

27. The non-transitory computing device readable medium as in claim 26, wherein the first human interface device is a keyboard.

28. The non-transitory computing device readable medium as in claim 26, wherein the controller is for disabling communication between the user-defined key in a deactivation state and the computing device.

29. The non-transitory computing device readable medium as in claim 26, further comprising:
a user profile on the computing device or the first human interface device to store data related to the user-defined key to be placed into a deactivation state.

30. The non-transitory computing device readable medium as in claim 26, wherein the options provided by the software application comprises at least one of:
an option to specify the user-defined key to be placed into a deactivation state, or the user-defined key the function of which is to be changed;
an option to specify whether the function of the user-defined key is to be swapped with another key of the plurality of keys;
an option to define a new function assignable to the user-defined key;
an option to define a timeout period in which the new function assigned to the user-defined key will be active;
an option to define whether the user-defined key reverts back to the function initially associated with the user-defined key after being assigned the new function;
an option to enable the user to use a pre-defined shortcut key under the software application for assigning a new function to the user-defined key; or
an option to allow the user to decide whether the user-defined key is assigned the new function upon system startup.

31. The non-transitory computing device readable medium as in claim 26, wherein the instructions further cause the computing device to place the user-defined key in a deactivation state when an input means is actuated, or to restore the user-defined key in the deactivation state for execution of the function associated therewith when the input means is re-actuated again.

32. The non-transitory computing device readable medium as in claim 31, wherein the input means is integrated into a second human interface device.

33. The non-transitory computing device readable medium as in claim 31, wherein the input means is one of a switch, a toggle and a button.

34. The non-transitory computing device readable medium as in claim 31, wherein the instructions further cause the computing device to restore the function associated with the user-defined key in the deactivation state when a release key is operated.

35. The non-transitory computing device readable medium as in claim 31, wherein the deactivation state of the user-defined key comprises one of deactivating the function associated with the user-defined key, and disabling communication between the user-defined key and the computing device.

36. An apparatus configured to provide options for a user to control the disabling or changing of a function of a user-defined key on a first human interface device, the apparatus comprising:
- a controller configured to communicatively intercouple a plurality of keys of the first human interface device with a computing device, wherein the controller is configured to disable any key of the plurality of keys by preventing electrical signals corresponding to actuation of the key from being transmitted to the computing device;
- wherein the plurality of keys are a set of undefined keys for deactivation;
- a deactivation key;
- wherein the deactivation key is configured to define at least one key of the set of undefined keys for deactivation upon actuating the deactivation key a first time simultaneously with the at least one key of the set of undefined keys and thereafter releasing the deactivation key and the at least one key of the set of undefined keys;
- wherein actuating the deactivation key a second time disables the at least one key of the set of undefined keys that has been defined;
- wherein the options comprises one or more of:
- an option to allow the user to define a new function assignable to the user-defined key;
- an option to load a key-profile corresponding to the defined new function into a memory of the computing device upon system startup.

* * * * *